United States Patent
Baker

(10) Patent No.: US 9,077,202 B1
(45) Date of Patent: Jul. 7, 2015

(54) POWER CONVERTER WITH SERIES ENERGY STORAGE

(75) Inventor: Gary B. Baker, Sherwood, OR (US)

(73) Assignee: SunPower Corporation, San Jose, CA (US)

( * ) Notice: Subject to any disclaimer, the term of this patent is extended or adjusted under 35 U.S.C. 154(b) by 737 days.

(21) Appl. No.: 12/983,237

(22) Filed: Dec. 31, 2010

Related U.S. Application Data

(60) Provisional application No. 61/291,628, filed on Dec. 31, 2009.

(51) Int. Cl.
| | | |
|---|---|---|
| *H02J 1/00* | (2006.01) | |
| *H02J 3/38* | (2006.01) | |
| *H02J 7/34* | (2006.01) | |
| *H02J 7/00* | (2006.01) | |
| *H02J 1/10* | (2006.01) | |
| *H02J 3/36* | (2006.01) | |

(52) U.S. Cl.
CPC ... *H02J 1/102* (2013.01); *H02J 3/36* (2013.01)

(58) Field of Classification Search
None
See application file for complete search history.

(56) References Cited

U.S. PATENT DOCUMENTS

2008/0062724 A1* 3/2008 Feng et al. .......... 363/17
2010/0157638 A1* 6/2010 Naiknaware et al. ......... 363/131

* cited by examiner

*Primary Examiner* — Jared Fureman
*Assistant Examiner* — Aqeel Bukhari
(74) *Attorney, Agent, or Firm* — Barnes & Thornburg LLP

(57) ABSTRACT

A power conversion system may include a first power converter to transfer power from a power source to a load, an energy storage element coupled in series between the first power converter and the load, and a second power converter to transfer energy between the energy storage element and the load. The system may be configured to provide a sinusoidal output suitable for grid-tie applications while maintaining constant input power.

16 Claims, 5 Drawing Sheets

US 9,077,202 B1

POWER CONVERTER WITH SERIES ENERGY STORAGE

CROSS-REFERENCE TO RELATED APPLICATION

This application claims priority from U.S. Provisional Patent Application Ser. No. 61/291,628 titled Power Converter With Series Energy Storage filed Dec. 31, 2009.

BACKGROUND

Power converters are used to convert electric power from one form to another, for example, to convert direct current (DC) power to alternating current (AC) power. One important application for power converters is in transferring power from energy sources such as solar panels, batteries, fuel cells, etc., to electric power distribution systems such as local and regional power grids. Most power grids operate on AC current at a line (or mains) frequency of 50 or 60 cycles per second (Hertz or Hz). Power in a single phase AC grid flows in a pulsating manner with power peaks occurring at twice the line frequency, i.e., 100 Hz or 120 Hz. In contrast, many energy sources supply DC power in a steady manner. Therefore, a power conversion system for transferring power from a DC source to an AC grid typically includes some form of energy storage to balance the steady input power with the pulsating output power.

This can be better understood with reference to FIG. 1 which illustrates the mismatch between a DC power source and a 60 Hz AC load. As shown, the amount of power available from the DC source is constant (or could be varying slowly). However, the amount of power transferred to the load is of the form sine-squared which is the product of the sinusoidal load voltage, and the corresponding sinusoidal load current. As shown, the sine-squared load-power waveform fluctuates from the zero power level at the minimum of the sin-squared waveform to a maximum value and back down to minimum twice every line cycle. For a system with a grid frequency, f_grid, a cycle-time corresponding to twice the line frequency is given by $1/(2*f\_grid)$, which is 10 milliseconds (ms) for 50 Hz systems, and 8.33 ms for 60 Hz system. During time T1, the power available from the DC source exceeds the instantaneous power required by the AC load. During time T2, however, the maximum power available from the DC source is less than that required by the AC load.

FIG. 2 illustrates a conventional system for converting DC power from a photovoltaic (PV) panel to AC power. The PV panel 10 generates a DC output current $I_{PV}$ at a typical voltage $V_{PV}$ of about 35 volts, but panels having other output voltages may be used. A DC/DC converter 12 boosts $V_{PV}$ to a link voltage $V_{DC}$ of a few hundred volts. A DC/AC inverter 14 converts the DC link voltage to an AC output voltage $V_{GRID}$. In this example, the output is assumed to be 120 VAC at 60 Hz to facilitate connection to a local power grid, but other voltages and frequencies may be used.

The system of FIG. 2 also includes a DC link capacitor $C_{DC}$ and a decoupling capacitor $C_1$. Either or both of these capacitors may perform an energy storage function to balance the nominally steady power flow from the PV panel with the fluctuating power requirements of the grid. Power ripple within the system originates at the DC/AC inverter 14, which must necessarily transfer power to the grid in the form of 120 Hz ripple. In the absence of a substantial energy storage device, this current ripple would be transferred all the way back to the PV panel where they would show up as fluctuations (or "ripple") in the panel voltage $V_{PV}$ and/or current $I_{PV}$. Therefore, the DC link capacitor $C_{DC}$ or the decoupling capacitor $C_1$, is used to store enough energy on a cycle-by-cycle basis to reduce the ripple at the PV panel to an acceptable level.

In a relatively recent development, the ripple at the PV panel has been reduced to essentially zero through the use of one or more control loops that cause the DC/DC converter 12 to draw constant power from the PV panel while allowing the voltage on the link capacitor $C_{DC}$ to vary over a relatively wide range. See, e.g., U.S. Patent Application Publication Nos. 2010/0157638 and 2010/0157632 which are incorporated by reference.

A problem with prior art approaches, however, is that all of the power may be processed sequentially through multiple power stages. Since each stage introduces various inefficiencies, the overall system efficiency is reduced. Also, since each stage must be designed to carry the full system power, the components in each stage must be sized accordingly, which may increase the cost and reduce the reliability of the components.

DETAILED DESCRIPTION

Figure 1:
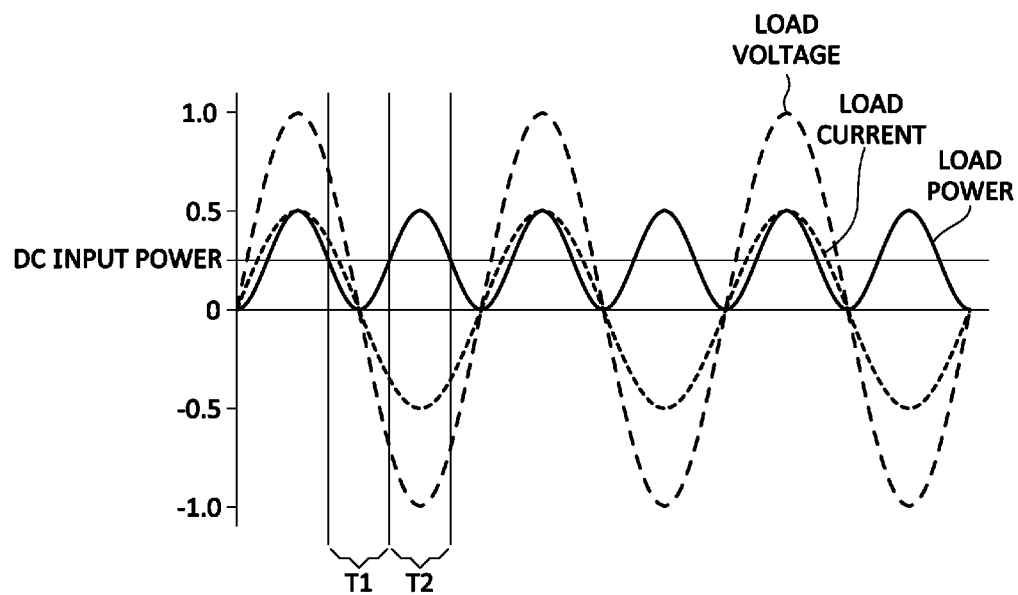
FIG. 1 illustrates the mismatch between a DC power source and an AC load.
Figure 2:
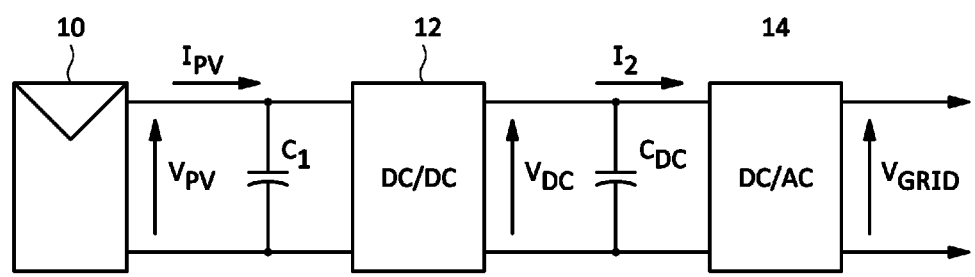
FIG. 2 illustrates a prior art system for converting DC power from a photovoltaic panel to AC power.
Figure 3:
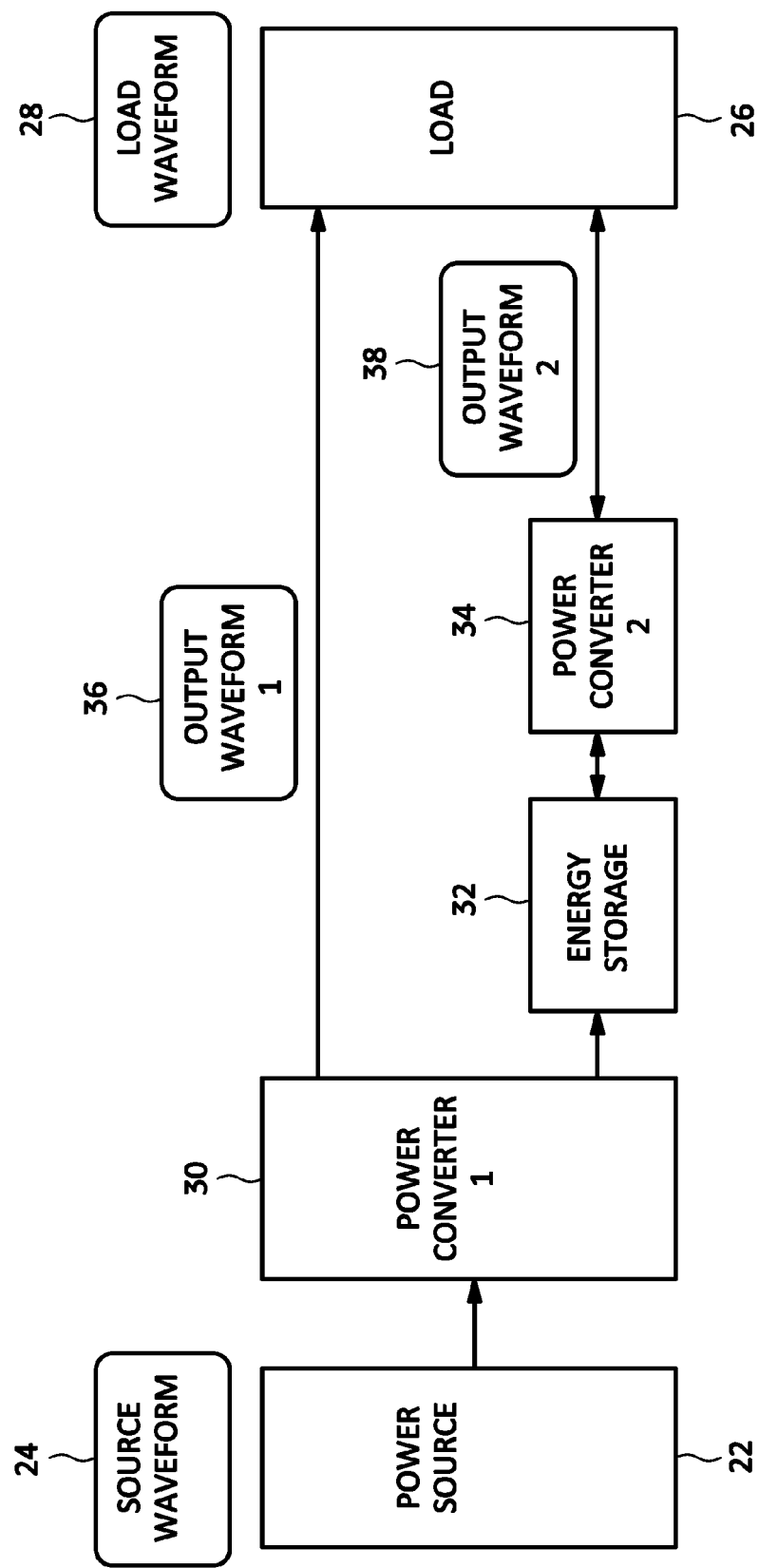
FIG. 3 illustrates an embodiment of an energy conversion system according to some inventive principles of this patent disclosure.

FIG. 3 illustrates an embodiment of a power conversion system according to some inventive principles of this patent disclosure. The embodiment of FIG. 3 includes a power source 22 having has a source waveform 24 that is generally required for optimum performance of the power source. For example, if the power source is a photovoltaic (PV) panel, the source waveform may be a flat quasi-constant power waveform. That is, the power available from the PV panel may appear to be constant on the scale of a few line cycles, but it may vary slowly over time in response to shading and/or changes in temperature, solar inclination, etc. As used herein, waveform with a constant value may refer to a truly constant value, or a quasi-constant value. If the power source is an AC generator, however, the source waveform may be a sine wave.

The embodiment of FIG. 3 also includes a load 26 having a load waveform 28 that is generally required for optimum performance of the load. As with the power source, the load waveform depends on the nature of a load. If the load includes an electrochemical battery, the load waveform may be a flat constant power waveform, whereas, if the load is a utility grid, the load waveform may be a sine wave.

A first power converter 30 transfers power from the power source to the load and to an energy storage element 32 coupled in series between the first power converter and the load. A second power converter 34 is arranged to transfer energy between the energy storage element 32 and the load.

The first and second power converters may include any suitable power conversion apparatus such as rectifiers, inverters, commutators, or DC-DC converters including push-pull stages, buck converters, flyback converters, etc. Depending on the implementation, the second power converter may be capable of bi-directional or only unidirectional power transfer. The energy storage element may include a capacitor, inductor, battery, or any other suitable energy storage device.

In some embodiments, the first power converter may be configured to transfer the maximum instantaneous amount of power from the power source to the load. The second DC-DC converter may then transfer power to and from the energy storage element so the sum of the current from the first DC-DC converter and the second DC-DC converter is the desired load waveform. One potential advantage of this arrangement is that a portion of the total power is only processed once through the first DC-DC converter, while a lesser amount of power is processed a second time through the energy storage element and/or the second DC-DC converter. Thus, the amount of power that is processed twice may be reduced, thereby improving the overall system efficiency.

Figure 4:
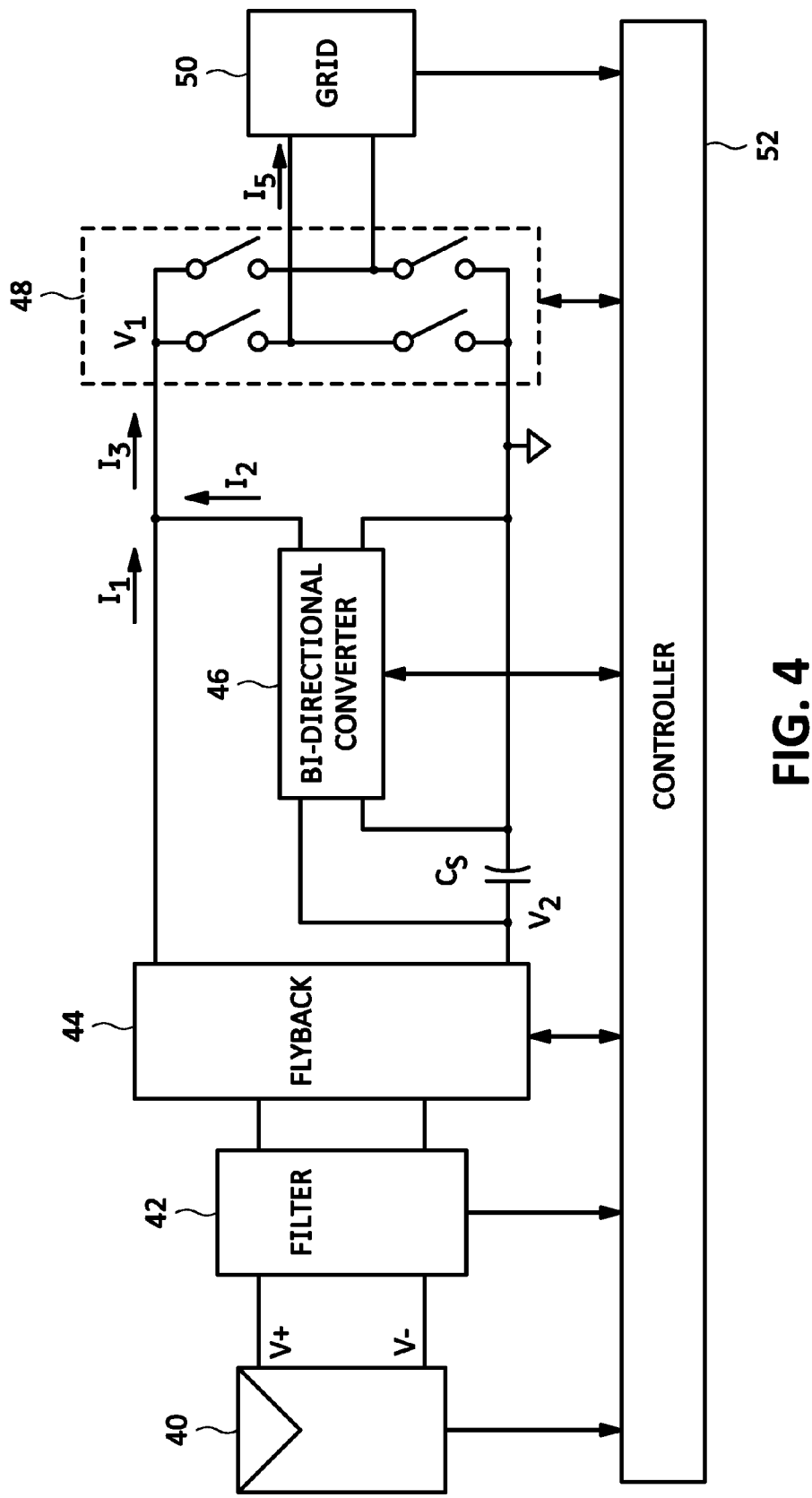
FIG. 4 illustrates an example embodiment of an energy conversion system according to some inventive principles of this patent disclosure.

FIG. 4 illustrates an example embodiment of a power conversion system according to some inventive principles of this patent disclosure. The embodiment of FIG. 4 is described in the context of a panel-mounted microinverter system for converting DC power from a solar panel to AC power that can be fed into a utility grid, but the inventive principles are not limited to these implementation details. Referring to FIG. 4, the power source is a PV panel 40 and the load includes a utility grid 50. The first DC-DC converter is a flyback converter 44 that provides galvanic isolation and boosts the voltage from the PV panel to a suitable DC level. A filter circuit 42 may include any suitable arrangement of inductors, capacitors, etc., to prevent switching noise from the flyback converter from being fed back into the PV panel.

The energy storage element in this embodiment is a storage capacitor $C_S$ that is connected in series between the flyback converter and the load which, in this embodiment, also includes an H-bridge 48 arranged as a simple commutator. A second DC-DC converter 46 provides bi-directional energy transfer to and from the storage capacitor. A controller 52 includes monitoring and control circuitry to control the overall operation of the system. The controller may receive voltage and/or current sense inputs from the PV panel, input filter, and grid load. The controller may also receive sense inputs from, and provide control outputs to, the flyback converter, the bi-directional converter, and the commutator.

The controller may be configured to cause the first DC-DC converter to draw substantially constant power from the PV panel, and to cause the first and second DC-DC converters to provide a rectified substantially sinusoidal current $I_3$ to the load. As explained in more detail below, first DC-DC converter, i.e., the flyback converter, may transfer a maximum instantaneous amount of power from the power source to the load. The second DC-DC converter may then transfer power to and from the capacitor so the sum of the current $I_1$ from the first DC-DC converter and the current $I_2$ from the second DC-DC converter is the rectified substantially sinusoidal current $I_3$. The commutator then commutates the rectified waveform to provide the final output current $I_5$ as a sinusoidal waveform.

Figure 5:
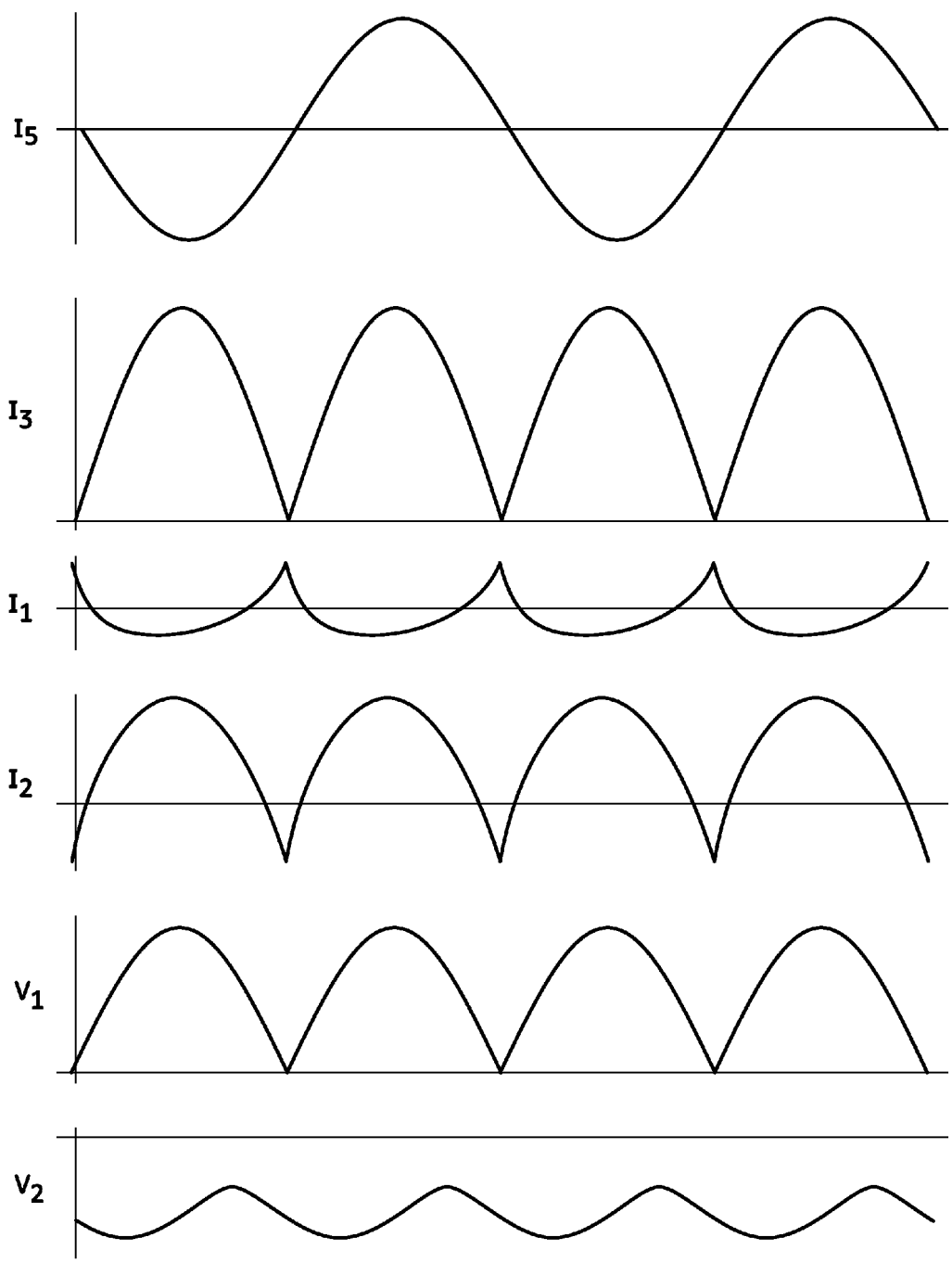
FIG. 5 illustrates waveforms within the embodiment of FIG. 4.

The operation of the system of FIG. 4 will now be described in more detail with reference to FIG. 5. The flyback converter 44 operates at a constant power level set by an MPP tracking algorithm in the controller 52 to maximize the power harvest from the PV panel. The flyback output voltage $V_1$ is allowed to vary and at any instant is set by the voltage on the energy storage capacitor node $V_2$ plus the voltage set by the AC grid at node $V_1$. Thus, the flyback output voltage is the difference between $V_1$ and $V_2$. Since the power out of the flyback converter is constant (given a constant PV panel power), its output current will be time varying in the form $I_1$ so as to accommodate the sinusoidal output voltage.

Because the flyback converter is in series with the energy storage capacitor and the grid output, its power output is split between providing power to the grid and storing energy in the capacitor. The grid current is required to be sinusoidal with low harmonic content. To accomplish this, the bidirectional converter is used to provide the current $I_2$ such that the sum of $I_1$ and $I_2$ results in a rectified sine waveform $I_3$. The current $I_3$ is switched synchronously with the grid voltage such that the resulting grid current is sinusoidal and in phase with the grid voltage.

An advantage of this arrangement is that only part of the grid current is processed twice while the remainder of the power flow is directly out of the flyback, thus providing an opportunity for higher overall efficiency. Also, since only a portion of the power flows through the second DC-DC converter, the components in this path need only be sized to handle a portion of the system power, thereby reducing the cost and improving the reliability of these components. Moreover, the bi-directional power converter may be used to harmonically correct the current waveform out of the flyback converter.

Figure 6:
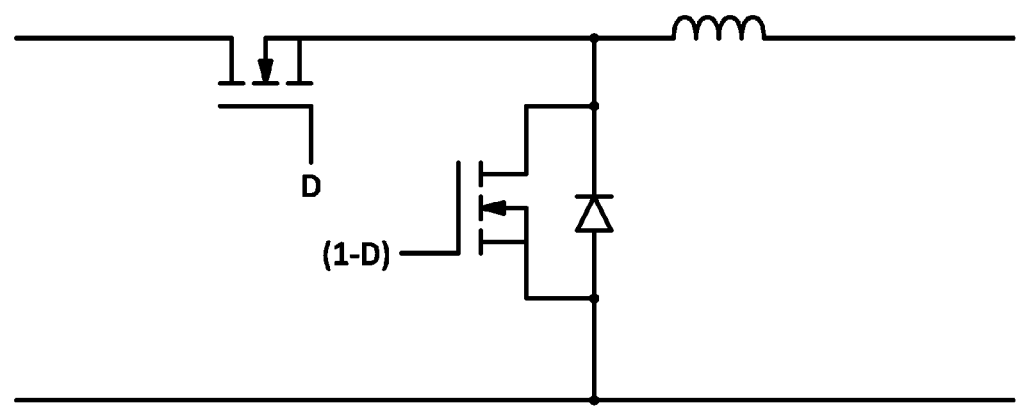
FIG. 6 illustrates an embodiment of a bi-directional power converter suitable for use as the second DC-DC converter 46 illustrated in FIG. 4.

FIG. 6 illustrates an embodiment of a bi-directional power converter suitable for use as the second DC-DC converter 46 illustrated in FIG. 4.

The inventive principles of this patent disclosure have been described above with reference to some specific example embodiments, but these embodiments can be modified in arrangement and detail without departing from the inventive concepts. For example, the embodiment of FIG. 4 is shown as a single-phase implementation, but the inventive principles may be applied to three-phase and other types of systems as well. As further examples, the system may be modified to accept an AC input and provide DC output power, and multiple energy storage elements and bi-directional converters may be utilized, e.g., connected in parallel. Such changes and modifications are considered to fall within the scope of the following claims.

The invention claimed is:

1. A system comprising:
    a first power converter to generate a first output waveform and transfer power from a power source to a load;
    an energy storage element coupled in series between the first power converter and the load; and
    a second power converter to generate a second output waveform and transfer energy between the energy storage element and the load, wherein the second power converter comprises a bidirectional power converter,
    wherein the load has a load waveform and the first and second output waveforms combine to generate the load waveform.

2. The system of claim 1, wherein the energy storage element comprises a capacitor.

3. The system of claim 1, wherein the first power converter is configured to draw substantially constant power from the load.

4. The system of claim 1 where:
    the first output waveform comprises a first current waveform; and
    the first current waveform is determined by the voltage across the load and the voltage across the energy storage element.

5. The system of claim 4 where:
the second output waveform comprises a second current waveform; and
the first and second current waveforms combine to form the load waveform as a rectified sinusoidal waveform.

6. A method comprising:
transferring power from a power source to a first power converter;
transferring a first portion of the power from the first power converter substantially directly to a load;
transferring a second portion of the power from the first power converter to an energy storage element coupled in series between the first power converter and the load; and
transferring power from the energy storage element to the load through a second power converter, wherein the power is transferred bi-directionally through the second power converter and the sum of the first and second portions of the power from the first power converter comprise a substantially constant amount of power.

7. The method of claim 6 further comprising actively shaping the waveform of the power to the load.

8. The method of claim 6 where the energy storage element comprises a capacitor.

9. The method of claim 6 where the first portion of the power has a first current waveform that is determined by the sum of the voltage of the load and the voltage of the energy storage element.

10. The method of claim 9 where the second power converter generates a second current waveform that is added to the first current waveform to generate the waveform of the power to the load.

11. The method of claim 10 where the waveform of the power to the load comprises a rectified sinusoidal waveform.

12. A system comprising:
a first DC-DC converter having a first output terminal coupled to a first input terminal of a load;
a capacitor coupled between a second output terminal of the first DC-DC converter and a second input terminal of the load;
a second DC-DC converter coupled between the capacitor and the load, wherein the second DC-DC converter is configured to bi-directionally transfer power from the capacitor to the load; and
a controller coupled to the first and second DC-DC converters, wherein the controller is configured to (i) cause the first and second DC-DC converters to provide a rectified substantially sinusoidal current to the load and (ii) cause the second DC-DC converter to transfer power to and from the capacitor so the sum of the current from the first DC-DC converter and the second DC-DC converter is the rectified substantially sinusoidal current.

13. The system of claim 12 where the second DC-DC converter comprises:
first and second input terminals coupled to first and second terminals of the capacitor; and
first and second output terminals coupled to the first and second input terminals of the load.

14. The system of claim 12 where the controller is configured to cause the first DCDC converter to draw substantially constant power from a power source.

15. The system of claim 14 where the controller is configured to cause the first DC-DC converter to transfer a maximum instantaneous amount of power from the power source to the load.

16. The system of claim 12 where the load comprises a commutator.

* * * * *